United States Patent [19]

Honda

[11] Patent Number: 5,072,436
[45] Date of Patent: Dec. 10, 1991

[54] OPTICAL DEVICE FOR RECORDING AND REPRODUCING INFORMATION

[75] Inventor: Syuichi Honda, Yokohama, Japan

[73] Assignee: Ricoh Company, Ltd., Tokyo, Japan

[21] Appl. No.: 602,126

[22] Filed: Oct. 19, 1990

[30] Foreign Application Priority Data

Oct. 25, 1989 [JP] Japan ................................. 1-277850

[51] Int. Cl.$^5$ ............................ G11B 7/00; G11B 7/12
[52] U.S. Cl. .................................. 369/112; 369/44.11; 369/44.14; 359/831
[58] Field of Search ................ 369/112, 109, 111, 110, 369/44.17–44.19, 44.20, 44.21, 44.11, 44.14; 250/201.5, 114, 119; 350/287

[56] References Cited

U.S. PATENT DOCUMENTS 4,719,614  1/1988  Leterme et al. ..................... 369/112

FOREIGN PATENT DOCUMENTS 0162235  6/1989  Japan ................................. 369/112
2-76135  3/1990  Japan .

OTHER PUBLICATIONS

Mitsuroh Moriya et al., "CMF Actuator and High Speed Access System" of Nat'l Technical Report, vol. 35, No. 2, pp. 67–73, 04/89.

Primary Examiner—Roy N. Envall, Jr.
Assistant Examiner—Thang V. Tran
Attorney, Agent, or Firm—Cooper & Dunham

[57] ABSTRACT

An optical pickup device that comprises a laser source for emitting a laser beam, an objective lens for converging the laser beam to a surface of an optical information recording medium to write optical information thereon, an optical signal detection system for detecting light reflected from the medium surface to read the information written on the medium and a deflection member disposed between the laser source and the objective lens for deflecting the laser beam to the lens. The deflection member has a deflection point where the laser beam is reflected toward the objective lens. The deflection member is arranged universally rotatable about the deflection point.

18 Claims, 4 Drawing Sheets

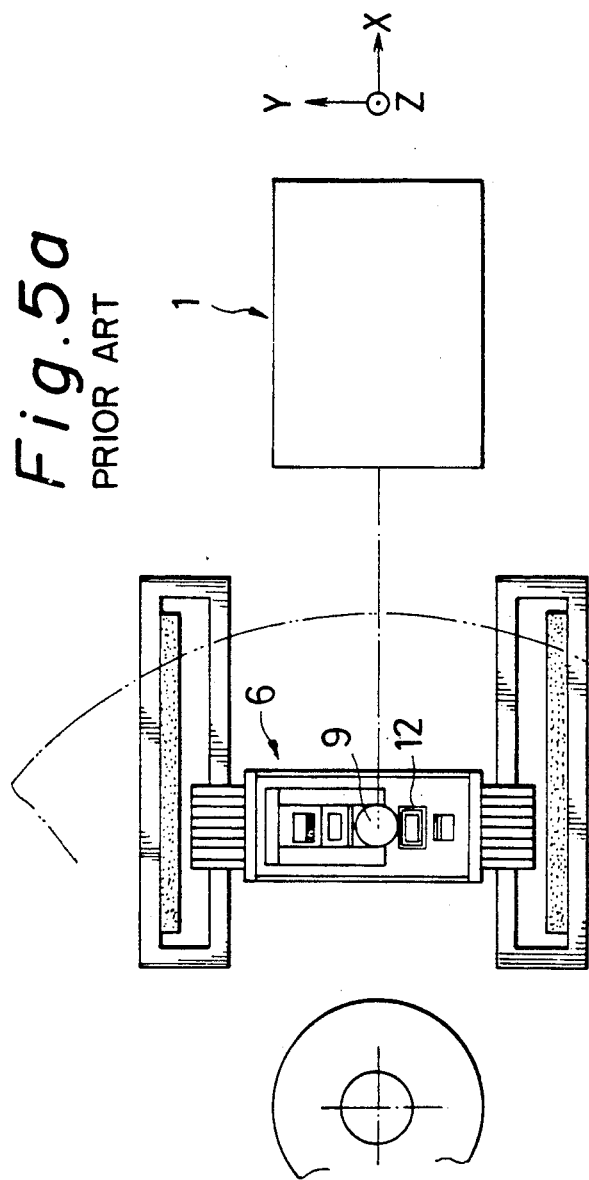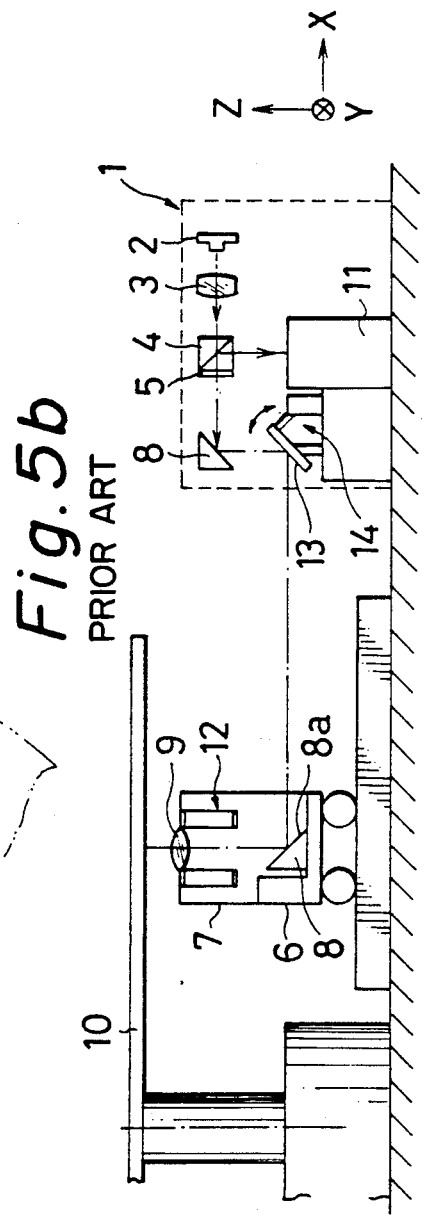

OPTICAL DEVICE FOR RECORDING AND REPRODUCING INFORMATION

BACKGROUND OF THE INVENTION

1. Field of the Invention

The present invention relates to an optical pickup device for writing and reading information in conjunction with a magnetooptical disk or other recording mediums.

2. Description of the Related Art

An example of the optical pickup device is described below.

The device comprises a fixed optical system and a movable optical system. The fixed optical system is composed of a semiconductor laser source, a coupling lens, a polarization beam splitter and a quarter-wave plate. A laser beam emitted from the laser source is collimated by the coupling lens. The collimated beam passes through the beam splitter and the quarter-wave plate, respectively, and propagates out of the fixed system toward the movable system.

The movable system comprises a carriage, a deflection prism mounted on the carriage and an objective lens also mounted on the carriage. The system is movably disposed below an optical disk.

The laser beam output from the fixed system enters into the movable system in which the beam is deflected perpendicularly by the prism and converged by the lens to a point on the optical disk surface so that information data are written on the disk.

The beam is reflected and scattered from the irradiation point on the disk surface. A part of the reflection light enters back into the movable system. The reflection light propagates back through the lens and the prism, repectively, in the movable system and enters again into the fixed system. In the fixed system, the light is reflected by the beam splitter to be guided into an optical signal detection system which reads information written in the disk and detects a focus error signal or a track error signal from the reflection light.

However, the optical pickup device mentioned above involves problems as follows.

First, the optical axis of the laser beam transmitted from the fixed system to the movable system in which the beam is reflected by the prism to the objective lens is inclined by angle $\theta$ with respect to the optical axis of the lens due to inaccuracy of the prism shape, for example, in the event that the deflection surface of the prism is not accurately formed with an inclination angle of 45 degrees with respect to the bottom surface thereof or dislocation of the prism due to an assembly error.

Also, if the prism 8 is mounted in the state of inclining by angle $\theta$, the laser beam enters the objective lens with an inclination of angle 2$\theta$ to the optical axis of the objective lens.

Such a misalignment of optical axes between the lens and the incident beam causes astigmatism and coma aberration so that the spot shape of the converged beam irradiated to the surface of the disk is deformed, which degrades the imaging state of the beam and lowers the reliability of signal detection, accordingly.

To avoid such a problem, it becomes necessary to raise the accuracy of the prism shape and the assembly location and attitude of the prism, which results in raise of the cost.

Besides, with respect to the separation type pickup device, that is, the device which is divided to two parts, i.e., the fixed optical system and the movable optical system, the device has to be arranged in such a way that the optical axis of the beam output from the fixed system is accurately in parallel to the moving axis of the carriage and that the beam is accurately deflected toward the direction perpendicular to the moving axis of the carriage by the optical element mounted in the carriage. Therefore, with regard to the separation type device, the accuracy of the optical element regarding the shape and size or the assembly location and attitude is more critically required in comparison to the one unit type device which is not divided to two optical systems to avoid the problems, mentioned above.

There is a method aiming at avoiding the misalignment of the optical axis of the objective lens and that of the beam incident to the lens due to the errors in the shape or size of the prism itself or the mounting position or attitude of the prism when assembling the device. The method is such that the laser source is arranged movable in the direction of the axis Z (vertical direction) and the direction of the axis Y (horizontal direction) with respect to the coupling lens.

However, the above-mentioned method also involves in the problem that the optical axis of the laser beam emitted from the source is inclined with respect to the optical axis of the coupling lens due to the errors in the shape and size of the prism, the beam splitter or the quarter-wave plate and those of the carriage.

Another example of the optical pickup device relating to the present invention comprises a carriage in which a focus control unit for moving the objective lens along its optical axis is mounted and a fixed optical system which includes a track control unit comprising a galvano-mirror for tracking, whereby aiming at reduction of the access time.

However, this structure requires further strict accuracy of the optical elements and the assembly thereof than the structure in which the tracking means is disposed in the carriage, mentioned before, since the optical beam is inclined to transmit it to the objective lens by rotating the mirror so as to carry out the tracking operation.

SUMMARY OF THE INVENTION

It is therefore an object of the present invention to provide an optical pickup device which obviates the above-mentioned problems and makes it possible to raise the detactability of signals without the necessity for high accuracy of optical elements.

The above-mentioned object of the present invention can be achieved by an optical pickup device comprising:

a laser source for emittig a laser beam;

an objective lens for converging the laser beam to a surface of an optical information recording medium to write optical information thereon;

an optical signal detection system for detecting light reflected from the medium surface to read the information written on the medium; and a deflection member disposed between the laser source and the objective lens for deflecting the laser beam to the lens, the deflection member having a deflection point where the laser beam is reflected toward the objective lens and being universally rotatable about the deflection point.

Advantages of the above-mentioned structure of the optical pickup device in accordance with the present invention are that it becomes possible to correct the misalignment of the optical axes of the elements and that the signal detectability and functional reliability of the device can be heightened.

Further objects and advantages of the present invention will be apparent from the following description of the preferred embodiments of the invention as illustrated in the accompanying drawings.

BRIEF DESCRIPTION OF THE DRAWINGS

FIG. 1b is a side view of the pickup device of FIG. 1a;

FIG. 5a is a plan view of another example of the optical pickup device in accordance with the related art;

FIG. 5b is a side view of the pickup device of FIG. 5a;

DESCRIPTION OF THE PREFERRED EMBODIMENTS

Figure 1A:
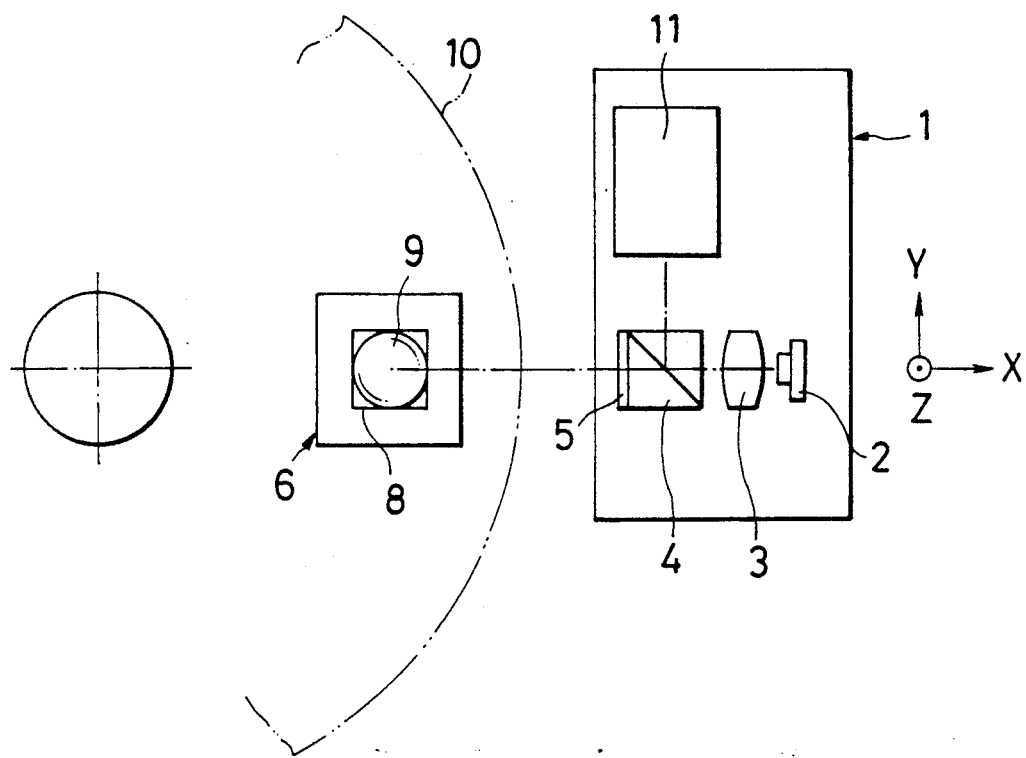
FIG. 1a is a top view of an example of the optical pickup device in accordance with the related art.

Embodiments of the present invention are described hereinafter with reference to the drawings in comparison to the related art which is also described referring to the drawings.

Figure 1B:
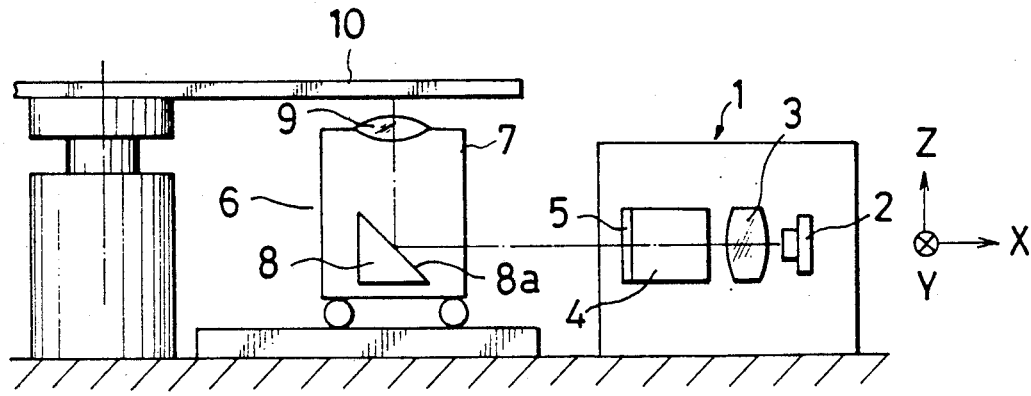

FIGS. 1a and 1b illustrate an example of the optical pickup device to which the present invention is related and can be applied. The present invention is improved from the structure of this related art.

The device comprises a fixed optical system 1 and a movable optical system 6. The fixed optical system 1 is composed of a semiconductor laser source 2, a coupling lens 3, a polarization beam splitter 4 and a quarter-wave plate 5. A laser beam emitted from the laser source 2 is collimated by the coupling lens 3. The collimated beam passes through the beam splitter 4 and the quarter-wave plate 5, respectively, and propagates out of the fixed system 1 toward and movable system 6.

The movable system 6 comprises a carriage 7, a deflection prism 8 mounted on the carriage 7 and an objective lens 9 also mounted on the carriage 7. The system 6 is movably disposed below an optical disk 10.

The laser beam output from the fixed system 1 enters into the movable system 6 in which the beam is deflected perpendicularly by the prism 8 and converged by the lens 9 to a point on the optical disk surface so that information data are written on the disk 10.

The beam is reflected and scattered from the irradiation point on the disk surface. A part of the reflection light enters back into the movable system. The reflection light propagates back through the lens 9 and the prism 8, respectively, in the movable system 6 and enters again into the fixed system 1. In the fixed system 1, the light is reflected by the beam splitter 4 to be guided into an optical signal detection system 11 which reads information written in the disk 10 and detects a focus error signal or a track error signal from the reflection light.

However, the optical pickup device mentioned above involves problems as follows.

Figure 2:
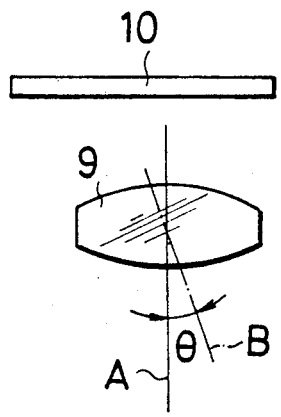
FIG. 2 is an explanatory view for explaining problems involved in the pickup device of the related art.

First, as illustrated in FIG. 2, the optical axis B of the laser beam transmitted from the fixed system 1 to the movable system 6 in which the beam is reflected by the prism 8 to the objective lens 9 is inclined by angle $\theta$ with respect to the optical axis A of the lens 9 due to inaccuracy of the prism shape, for example, in the event that the deflection surface 8a of the prism 8 is not accurately formed with an inclination angle of 45 degrees with respect to the bottom surface thereof or dislocation of the prism due to an assembly error.

Figure 3:
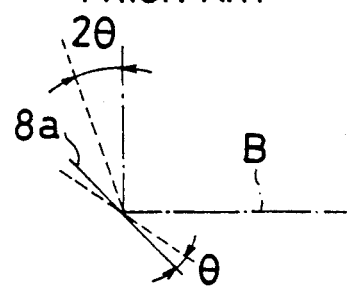
FIG. 3 is another explanatory view for explaining problems involved in the pickup device of the related art.

Also, if the prism 8 is mounted in the state of inclining by angle $\theta$, as shown in FIG. 3, the laser beam enters the objective lens with an inclination of angle $2\theta$ to the optical axis of the objective lens.

Such a misalignment of optical axes A and B between the lens 9 and the incident beam causes astigmatism and coma aberration so that the spot shape of the converged beam irradiated to the surface of the disk 10 is deformed, which degrades the imaging state of the beam and lowers the reliability of signal detection, accordingly.

To avoid such a problem, it becomes necessary to raise the accuracy of the prism shape and the assembly location and attitude of the prism, which results in raise of the cost.

Besides, with respect to the separation type pickup device, that is, the device which is divided to two parts, i.e., the fixed optical system 1 and the movable optical system 6, the device has to be arranged in such a way that the optical axis of the beam output from the fixed system is accurately in parallel to the moving axis of the carriage 7 and that the beam is accurately deflected toward the direction perpendicular to the moving axis of the carriage 7 by the optical element mounted in the carriage. Therefore, with regard to the separtion type device, the accuracy of the optical element regarding the shape and size or the assembly location and attitude is more critically required in comparison to the one-unit type device which is not divided to two optical systems to avoid the problems, mentioned above.

There is a method aiming at avoiding the misalignment of the optical axis A of the objective lens 9 and the optical axis B of the beam incident to the lens 9 due to the errors in the shape or size of the prism 8 itself or the mounting position or attitude of the prism 8 when assembling the device. The method is such that the laser source 2 is arranged movable in the direction of the axis Z (vertical direction) and the direction of the axis Y (horizontal direction) with respect to the coupling lens 3.

Figure 4:
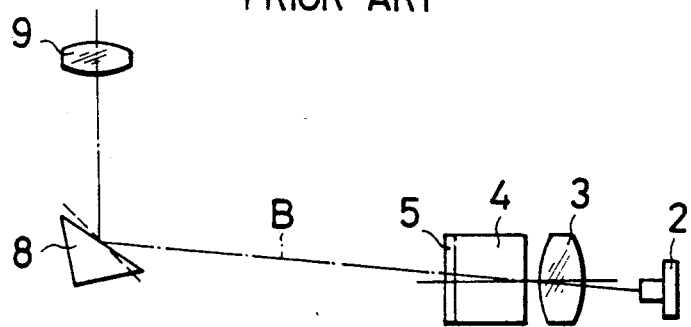
FIG. 4 is still another explanatory view for explaining problems involved in the pickup device of the related art.

However, the above-mentioned method also involves in the problem that the optical axis of the laser beam emitted from the source 2 is inclined with respect to the optical axis of the coupling lens 3 due to the errors in the shape and size of the prism 8, the beam splitter 4 or the quarter-wave plate 5 and those of the carriage 7, as illustrated in FIG. 4.

Another example of the optical pickup device relating to the present invention is illustrated in FIGS. 5a and 5b and comprises a carriage 7 in which a focus control unit 12 for moving the objective lens 9 along its optical axis is mounted and a fixed optical system 1 which includes a track control unit 14 comprising a galvano-mirror 13 for tracking, whereby aiming at reduction of the access time.

However, this structure requires further strict accuracy of the optical elements and the assembly thereof than the structure in which the tracking means is disposed in the carriage, mentioned before (FIGS. 1a and 1b), since the optical beam is inclined to transmit it to the objective lens 9 by rotating the mirror 13 so as to carry out the tracking operation.

The above-mentioned problems can be obviated by the embodiments of the present invention described below.

Figure 7:
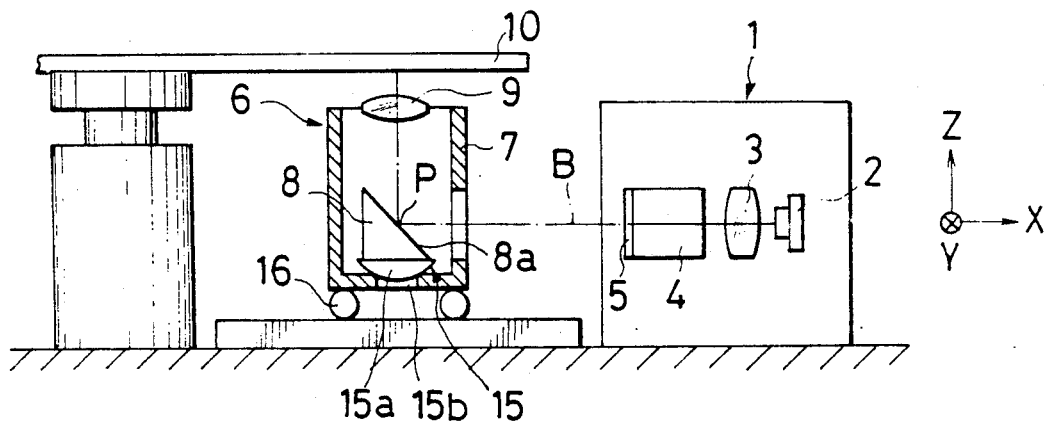
FIG. 7 is a constructional side view of an embodiment of the optical pickup device in accordance with the present invention.
Figure 8:
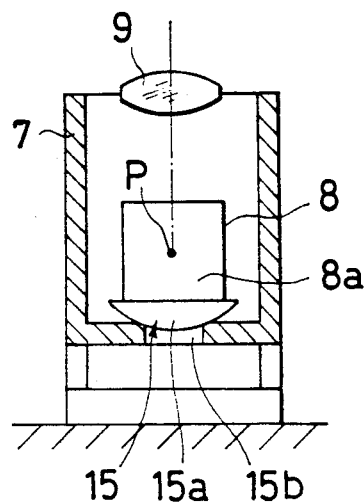
FIG. 8 is a front view of the movable optical system installed in the pickup device of FIG. 7.

FIG. 7 illustrates an embodiment of the optical pickup device in accordance with the present invention. The structure of this embodiment is improved from that of FIGS. 1a and 1b. The corresponding parts of the structure of FIG. 7 are designated by the same numerals as those of FIGS. 1a and 1b.

A deflection prism 8 is disposed on a prism holder 15 which is constituted from a partial spherical seat 15a and a cylindrical hollow 15b formed in the bottom of the carriage 7. The seat 15a is disposed over the hollow 15b. The seat 15a is rotatable about a deflection point P on the deflection surface 8a of the prism 8 at which point P the incident beam B transmitted from the fixed optical system 1 into the carriage 7 is reflected toward the objective lens 9. That is, the holder 15 is arranged in such a way that the deflection surface 8a of the prism 8 is rotatable about the three axes X, Y and Z, with respect to the point P being as the center of the rotation.

The rotatable arrangement of the prism holder is further described below.

As an example, an allowable inclination angle of the optical axis B of the incident beam with respect to the optical axis A of the objective lens 9 is assumed as 40' (minutes). Also, the incident beam B is assumed to become deviated by rotating about the axis Y in the Z-X plane.

If the inaccuracy of the deflection surface 8a of the prism is 5' (minutes), that is, the surface 8a is inclined by 5' from the perfect reference surface of the prism, the optical axis of the beam reflected on the surface 8a toward the disk 10 becomes deviated by angle 10' (minutes). Also, if the inaccuracy of the prism mounting surface is 5' (minutes) with respect to the rollers 16 of the carriage 7, the optical axis of the incident beam B becomes deviated by angle 10' (minutes). Besides, the lens 9 is held by a lens actuator (not shown) which is assembled to the carriage 7 with an inaccuracy of about 20 to 30' (minutes) with respect to a reference surface of the carriage. Further, there is another inaccuracy factor of the rollers 16. Therefore, the sum of these inaccuracy amounts comes to beyond the allowable limit of 40' (minutes). Accordingly, it becomes necessary to raise the accuracy of the optical elements such as the prism 8 and the lens 9 mounted on the carriage 7 for the purpose of avoiding astigmatism and coma aberration generated in the beam spot converged on the disk 10 causing the reduction of detectability of signals.

On the other hand, in accordance with the structure of the present invention, the above-mentioned problem is easily obviated with a simple construction due to the arrangement of the prism holder 15 comprising the seat 15a which enables the prism 8 to rotate about the three axes X, Y and Z, so that the inaccuracy is compensated for.

It is to be noted that the prism seat 15a may be disposed on the side wall or ceiling of the carriage 7 instead of the bottom plate, as mentioned above.

After the misalignment of the optical axes is corrected by adjusting the prism seat 15a, the seat 15a is secured to the hollow portion 15b by means of an adhesive agent.

Figure 9:
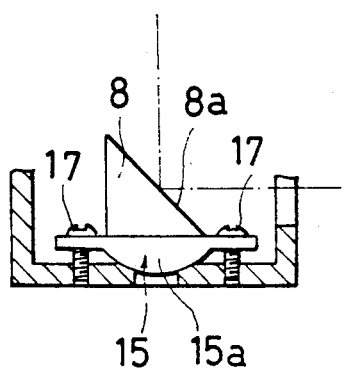
FIG. 9 is a partial detailed view of another embodiment of the optical pickup device in accordance with the present invention.

FIG. 9 illustrates another structure of the prism seat 15a which is secured to the bottom plate of the carriage by means of screws 17 instead of the adhesive agent.

The above-mentioned structure in accordance with the present invention can be applied to the structure of FIGS. 5a and 5b in which the movable galvano-mirror 13 is used.

Figure 6:
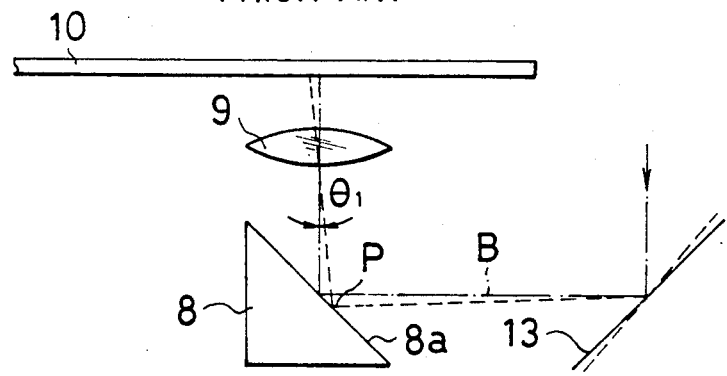
FIG. 6 is an explanatory view for explaining problems involved in the pickup device of FIGS. 5a and 5b.

In accordance with the structure of FIGS. 5a and 5b, when the tracking operation is executed, the mirror 13 is rotated to incline the beam output from the laser source 2 with respect to the optical axis A of the objective lens. Therefore, unlike the structure of FIG. 7, the beam axis inclines by angle $\theta_1$ with respect to the optical axis of the lens 9 irrespective of the arrangement of the optical elements, as illustrated in FIG. 6. Accordingly, the accuracy of the optical elements and assembly thereof has to be within $(\theta_0 - \theta_1)$ wherein $\theta_0$ designates the allowable inclination angle of the beam axis with respect to the optical axis of the lens 9 (40' in the above-mentioned embodiment of the invention of FIG. 7). This means that it is much more efficacious to adopt the arrangement of the prism holder 15 having the rotatable seat 15a to adjust the inclination of the deflection surface 8a of the prism 8 than in the case of the structure of FIG. 7, mentioned above.

As mentioned above, the optical pickup device in accordance with the present invention comprises a semiconductor laser source which emits a laser beam, a coupling lens which collimates the laser beam emitted from the laser source, an optical deflection member which deflects the collimated beam, an objective lens which receives the deflected beam and converges it on a surface of an optical information record medium to write information in the medium, and an optical signal detection system which receives light reflected from the record medium to read information written in the medium. The pickup device of the present invention is featured in that the deflection member is universally rotatable about the deflection point of the deflection surface of the deflection member, for example by adopting a structure in which a spherical surface is arranged on the deflection member or a housing member for the deflection member, the center of the sphere being coincident with the deflection point on the deflection surface, and the deflection member and the housing member being formed as one integrated body. Due to the featured structure, it becomes possible to remove the misalignment of the optical axes by adjusting the optical axis of the beam from the deflection member to the objective lens with respect to the optical axis of the lens and the optical axis of the beam emitted from the laser source with respect to the optical path between the laser source and the deflection member. Accordingly, it becomes possible to raise the reliability of signal detection without increasing the accuracy of optical elements itself and the assembling accuracy thereof.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical device for recording and reproducing information, comprising:
   a laser source means for emitting a laser beam;
   an objective lens for converging the laser beam emitted by said laser source means onto a surface of an optical information recording medium so as to write optical information on said recording medium; and
   a deflection means disposed between said laser source means and said objective lens for deflecting said emitted laser beam toward said objective lens;
   said deflection means comprising a deflection member having a deflection surface which deflects said emitted laser beam toward said objective lens, a partially spherical seat having a partially spherical surface thereof and an end surface thereof opposing said spherical surface, and a cylindrical hollow formed in a flat wall portion of a housing which supports said objective lens,
   said spherical surface centering a deflection point on said deflection surface of said deflection member which is mounted on said end surface of said spherical seat,
   said spherical seat being supported at said spherical surface thereof on an inner peripheral edge of said flat wall portion,
   said inner peripheral edge being defined by a wall of said flat wall portion defining said cylindrical hollow and an inner surface of said flat wall portion,
   said deflection member being attached to said end surface of said supported spherical seat such that said attached deflection member and said supported spherical seat can be pivoted around said deflection point.

2. An optical device according to claim 1, which comprises a fixing means for fixing said spherical seat to said flat wall portion of said housing after adjusting an optical axis of a laser beam deflected by said deflection member toward said objective lens with respect to an optical axis of said objective lens.

3. An optical device according to claim 2, in which said fixing means comprises an adhesive agent.

4. An optical device according to claim 2, in which said fixing means comprises screws.

5. An optical device according to claim 3, in which said laser source means comprises a laser source, and a coupling lens for collimating a laser beam emitted from said laser source.

6. An optical device according to claim 4, in which said laser source means comprises a laser source, and a coupling lens for collimating a laser beam emitted from said laser source.

7. An optical device according to claim 5, in which said deflection member deflects said emitted laser beam in a direction perpendicular to an optical path of said emitted laser beam.

8. An optical device according to claim 6, in which said deflection member deflects said emitted laser beam in a direction perpendicular to an optical path of said emitted laser beam.

9. An optical device according to claim 7, in which said deflection member comprises a prism.

10. An optical device according to claim 8, in which said deflection member comprises a prism.

11. The optical device according to claim 9, in which said flat wall portion is a bottom wall of said housing.

12. The optical device according to claim 10, in which said flat wall portion is a bottom wall of said housing.

13. The optical device according to claim 11, in which said flat wall portion is a side wall of said housing.

14. The optical device according to claim 12, in which said flat wall portion is a side wall of said housing.

15. The optical device according to claim 11, in which said cylindrical hollow is a through hole formed in said flat wall portion.

16. The optical device according to claim 12, in which said cylindrical hollow is a through hole formed in said flat wall portion.

17. The optical device according to claim 13, in which said cylindrical hollow is a through hole formed in said flat wall portion.

18. The optical device according to claim 14, in which said cylindrical hollow is a through hole formed in said flat wall portion.

* * * * *